Dec. 2, 1952 — D. JOHNSTON — 2,620,198
TRACTOR JACK
Filed Jan. 31, 1948 — 2 SHEETS—SHEET 2
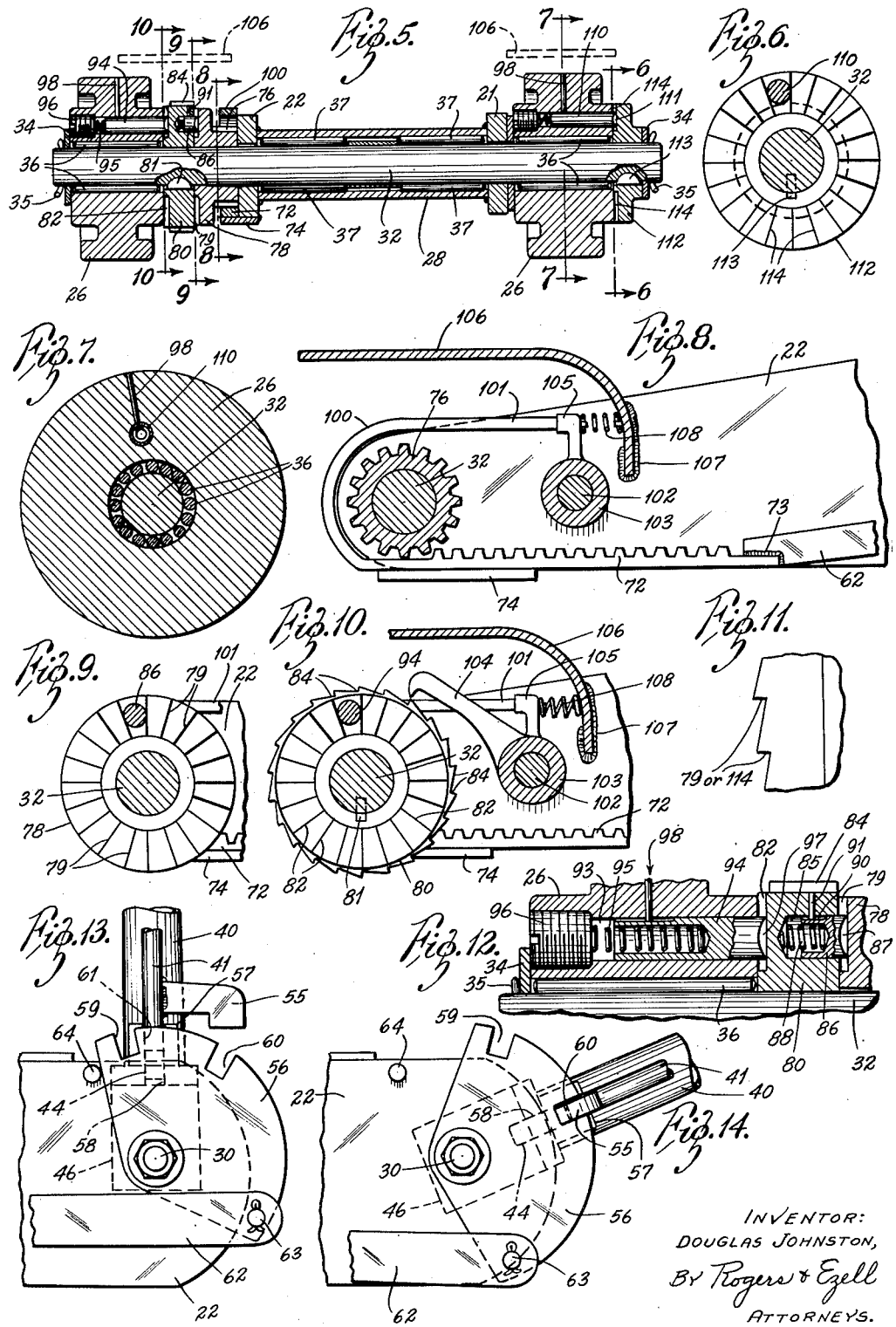
INVENTOR:
DOUGLAS JOHNSTON,
By Rogers & Ezell
ATTORNEYS.

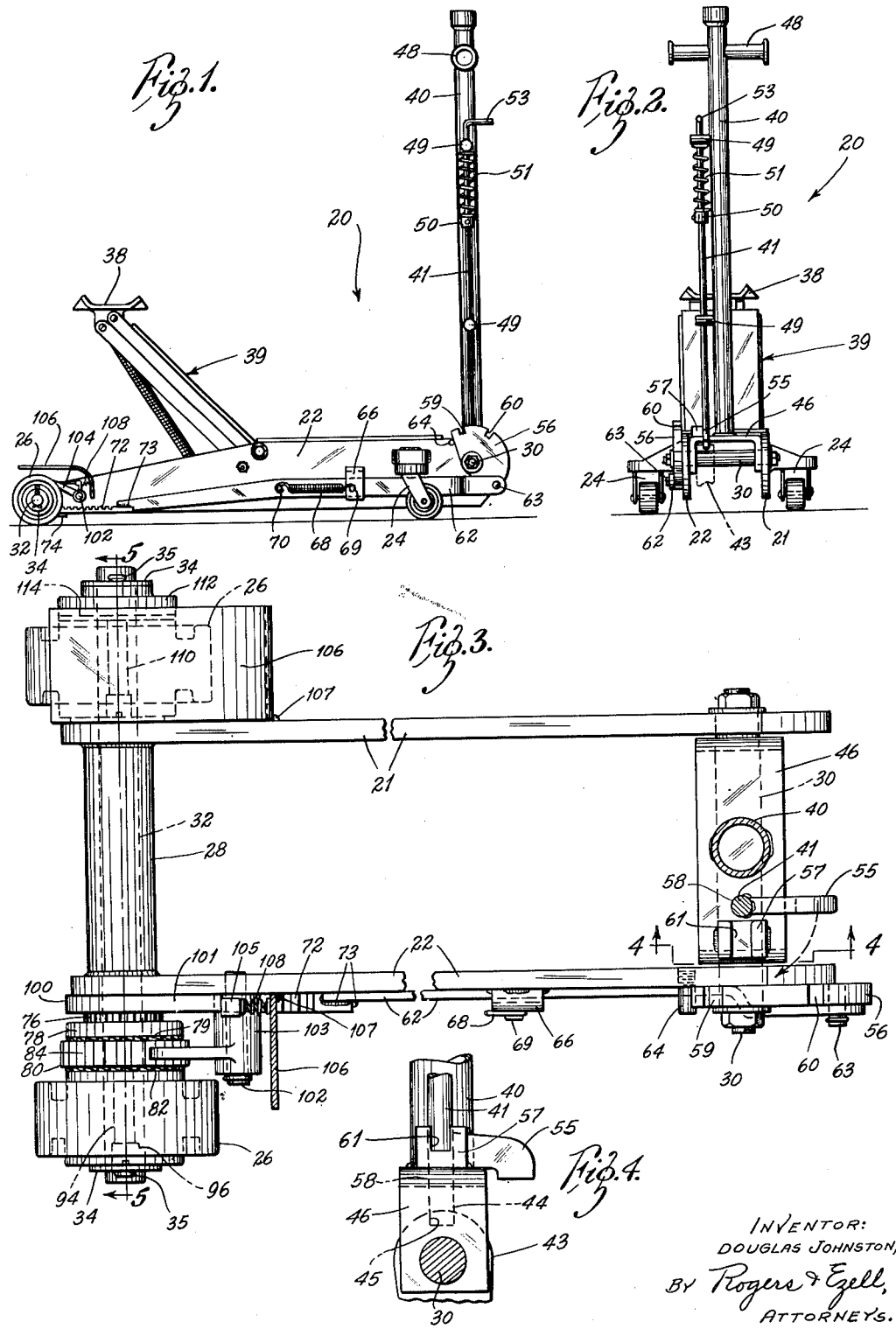

Patented Dec. 2, 1952

2,620,198

UNITED STATES PATENT OFFICE 2,620,198

TRACTOR JACK

Douglas Johnston, Huntsville, Ala., assignor to General Fluid Machinery Company, Huntsville, Ala., a corporation of Alabama Application January 31, 1948, Serial No. 5,639

11 Claims. (Cl. 280—3)

1

The present invention relates generally to improvements in apparatus designed for use in garages to service and repair automotive vehicles, particularly automobiles.

More specifically, the invention pertains to improvements in the construction of tractor jacks, also known to garage mechanics as tow jacks, or floor jacks. The invention is applicable to most standard jacks of this type, whether they be mechanically or hydraulically operable.

The primary purpose, for example, of a hydraulic jack, is to elevate a vehicle and maintain it in such position, in order to provide ample room underneath for a mechanic to make repairs and adjustments. As a general rule, during the course of such operations, it frequently becomes necessary to move the vehicle in its raised or jacked-up condition from one part of the shop to another. For this reason, all service jacks of this character are provided with swiveling casters at the rear, and wheels at the front. They are further equipped with a rotary saddle mounted on one end of a frame, which may be raised and lowered while supporting the front or rear of the vehicle, as is understood.

Prior to this invention, the transfer of a jacked-up vehicle from one point in the shop to another presented a considerable problem. The procedure generally included at least all of the operations to follow.

Thus, one man would manipulate the handle to bring it and the casters into the desired direction. Thereupon, it would be necessary for a number of fellow mechanics to temporarily abandon their individual work, in order to render assistance. While the first man would tug at the handle, the other men would push the vehicle body.

Obviously, operations of this kind have been inefficient and unsatisfactory from a number of standpoints, for example, the labor involved and the loss of time by skilled mechanics.

In a similar operation employing the present invention, a single operator is able quickly and easily to propel the heaviest load which the particular jack in use can support, by manipulating the jack handle while guiding the device.

To achieve this advantage, the present invention provides means whereby manual operation of the jack handle transmits power to the front wheels, through the medium of a rack and pinion arrangement in cooperation with other elements associated therewith, and with said wheels.

A primary object of the invention, therefore, is

2 to provide a jack construction, which, in use, may be operated by an individual to move a vehicle sustained thereon from one locale to another.

Another object is to provide means on the jack whereby it and the load thereon supported is automatically prevented from rolling backward when traveling upgrade.

A further object is to provide means whereby the jack and its load may be manually pulled in a desired direction without operating the power transmission means, and means whereby full differential action of the wheels aforesaid is provided at all times.

A feature of the invention resides in its adaptability to most conventional jacks of this type, without requiring many changes in their fundamental construction. That is to say, virtually all of the elements comprising this invention are added to, and cooperate with, mechanism already in vogue.

Incidental features and advantages of the invention, not thus far pointed out, will appear in the description to follow, reference being also had to the accompanying drawings, in which the preferred embodiment thereof is portrayed in association with a modern hydraulic jack. In said drawings:

Fig. 1 is a side elevational view of a jack, with its saddle in elevated position to support a vehicle, the latter not shown;

Fig. 2 is a rear elevational view thereof;

Fig. 3 is a top plan view, partly in section and on an enlarged scale, of the chassis of the jack, standard parts not included in the present invention being omitted in the interest of clarity;

Fig. 4 is a view partly in section, taken on line 4—4 of Fig. 3;

Fig. 5 is a vertical transverse section, taken approximately on line 5—5 of Fig. 3, certain guard members being indicated in broken lines;

Figs. 6, 7, 8, 9 and 10 are vertical sectional views, taken on lines 6—6, 7—7, 8—8, 9—9 and 10—10 in Fig. 5;

Fig. 11 is a fragmentary top plan view of a disc provided with ratchet teeth;

Fig. 12 is an enlarged fragmentary sectional view similar to the upper left-hand portion of Fig. 5;

Fig. 13 is an enlarged reproduction of the lower right-hand portion of Fig. 1, but with an operating element in raised position; and Fig. 14 is a similar view portraying an operative position of the parts included in the view.

With particular reference to Figs. 1 and 2, a standard hydraulic jack, incorporating the present invention, is generally designated by the reference numeral 20. Since jacks of this character are well known, it is not deemed necessary to enter into a detailed description of many of the component parts at this time.

Therefore, the jack 20 may be said to include a chassis composed of a pair of spaced side frames 21 and 22, a pair of swiveled caster assemblies 24 to support said chassis at the rear end thereof, a pair of wheels 26 to support said chassis at the front end thereof, a transverse tubular spacer member 28 joining the side frames at the front, and a transverse shaft 30 joining said side frames at the rear.

The spacer tube is welded to the opposing inner faces of the side plates, and an axle or shaft 32 extends therethrough, through said side plates, through the wheels 26, and through washers 34, with its projecting ends being apertured to receive cotter pins or the like 35. Elongated roller bearings 36 are interposed between the axle 32 and the bore of each wheel. Similar bearings 37 may be provided for the axle in the tube 28.

A horizontally rotatable saddle 38, included in a lift device 39, may be elevated and lowered by means of a pump mechanism, not shown.

The action of said pump is responsive to manipulation, through a ninety-degree arc, of a tubular handle 40, a rod 41 associated therewith, and a link having peripheral sockets adapted to receive the lower end of said rod.

A portion of the standard link referred to is shown fragmentarily in Figs. 2 and 4, and is designated by the numeral 43. The lower extremity of the rod 41 is designated 44, and one of the sockets adapted to receive it is designated 45.

As indicated in the drawings, the tubular handle 40 is welded at its lower end to an inverted channel-shaped member 46, freely rotatable about the shaft 30 which supports it. A handle bar 48 is provided adjacent the upper end of the handle 40.

The rod 41 is vertically reciprocable in spaced guides 49, and a collar 50 is secured thereto between which and the uppermost guide is positioned a spring 51 surrounding said rod. The spring 51 tends to bias the rod downwardly at all times. However, said rod may be raised by manually lifting the integral rearwardly projecting terminal extension 53, the latter being in proximity to the handle bar 48.

In association with the thus briefly described components of a standard service jack mechanism, the elements comprising this invention will now be described.

As previously indicated, with particular reference to Figs. 3, 4, 13 and 14, conventional parts not pertinent have been omitted in the views of the drawings. Further, it is noted that, in the description about to follow, various elements comprising the invention will be more or less categorically described. The purpose and operative functions thereof will appear in the operational description thereafter.

With this premise in mind, the elements comprising the invention include at the rear of the jack a laterally extending lug 55, preferably welded to the rod 41, a drive segment 56 rotatably mounted on one end of the shaft 30, and a channel-shaped lug 57 welded to the upper surface of the member 46. An aperture 58 is provided in the member 46 to accommodate the lower extremity 44 of the rod 41. The drive segment 56 has formed therein one or more peripheral notches, two being illustrated, and designated 59 and 60. A transverse slot 61 is provided in the lug 57, as seen particularly in Fig. 4.

An actuating link 62, which extends from the rear to the front of the jack, has a pivotal connection, as at 63, with the lower portion of the drive segment 56. An abutment pin 64 is permanently secured in the side frame 22 adjacent said segment.

As shown particularly in Figs. 1 and 3, a bracket 66, open at the bottom, is welded to the side frame 22, and acts as a guide for the link 62. One end of a spring 68 is secured thereto, as at 69, and at its other end, as at 70, to said link.

With particular reference to Figs. 3 and 5 through 12, the mechanism at the front end of the jack includes a rack bar 72 permanently secured, as by welding 73, to the front end of the link 62. A supporting plate 74 for the rack is welded to the side frame 22, as shown. The teeth of the rack bar 72 are adapted to engage the teeth of a rotatable pinion 76 which is mounted on the shaft 32 adjacent the side frame 22. Integrally formed with the pinion 76 is a disc 78 provided with a circular series of ratchet teeth 79.

Between the disc 78 and the wheel 26, there is interposed on the shaft 32 a ratchet wheel 80, keyed to the shaft as at 81. The wheel 80 is provided on one face thereof with ratchet teeth 82, similar in all respects to the ratchet teeth 79. In addition, the member 80 is provided with peripheral ratchet teeth 84, as best seen in Fig. 10.

As seen to best advantage in Fig. 12, the member 80 also is provided with a horizontally disposed bore 85, in which is mounted a substantially hollow ratchet pin or detent 86, the projecting end of which is beveled on one side as at 87. A spring 88 biases the pin into engagement with the ratchet teeth 79. In order to prevent rotation of the pin within the bore, it is provided with a shallow longitudinal external groove 90, into which a pin 91 projects. This pin is inserted into a hole drilled radially from the external periphery of the ratchet wheel 80, as shown.

The wheel 26 adjacent the wheel 80 is also provided with a horizontal bore 93 in which a substantially hollow ratchet pin or detent 94 is reciprocable. The pin 94 is adapted to have one of its extremities projecting into engagement with the ratchet teeth 82 by means of a spring 95. A threaded plug 96 is provided to seal the bore 93 at one end, and to provide an abutment for the spring. One side of the projecting end portion of the pin 94 is beveled as at 97. Rotation of said pin within the bore is prevented by a groove and pin arrangement 98, similar to that described in connection with the detent 86.

As particularly shown in Figs. 8 and 10, the rack 72 terminates at the front end of the jack in an arcuate extension 100 which partially surrounds the pinion 76 and terminates in a rearwardly extending horizontal portion 101. Rotatably mounted on a stud 102, secured to the frame member 22, is the hub 103 of a ratchet pawl 104. Integrally formed on, or welded to the hub 103, is an upstanding lug 105, and guard members 106 are welded to the side frames 21 and 22, as indicated at 107. Interposed between the lug 105 and the vertical portion of the adjacent guard member 106 is a compression spring 108.

The wheel 26 adjacent the side frame 21 has a ratchet pin assembly which is identical with the assembly in the other wheel. It is, therefore, not deemed necessary to describe said assembly in detail, but, in the interest of clarity in the description of operation hereinafter, the detent pin thereof is designated 110, and its beveled extremity is indicated 111.

Adjacent said wheel is a disc 112, which is keyed to the shaft 32, as indicated at 113. This disc is provided with ratchet teeth 114, similar in all respects to the ratchet teeth 79 of the disc 78. The configuration of the ratchet teeth 79, 82 and 114, as they appear in plan view, may be seen in Fig. 11.

*Operation*

It will be assumed that the saddle 38, with the vehicle body thereon, has been elevated to the position shown in Fig. 1 by actuating the pump mechanism of the jack, as is understood. Further, that the actuating handle, with its associated positioning rod 41, is in the vertical position shown. At such time, as is seen particularly in Fig. 4, the lower extremity 44 of said rod projects through the aperture 58 into the socket 45 of the pump operating link, and the lug 55 rests on the top of the member 46.

It will further be assumed that the saddle 38 is in position under the forward portion of the vehicle, the rear wheels of the latter resting on the floor.

Should it now become necessary to move the jack to another part of the shop, the mechanic first raises the positioning rod 41 by means of the extension 53 against the downward pressure of the spring 51.

As portrayed particularly in Fig. 13, this action causes the lower extremity 44 of the rod to leave the socket 45, so that actuation of the pump while the jack is in motion is impossible. It is, however, desirable that the lower extremity of the rod be prevented from leaving the aperture 58. To this end, the collar 50 is secured to the rod in a predetermined position to limit the upward travel of said rod.

With the rod 41 and its lug 55 in the position shown in Fig. 13, the operator now rotates the rod through a ninety-degree arc, as indicated by the broken line arrow in Fig. 3. This brings the lowermost edge of the lug in approximate contact with the peripheral edge of the rack operating segment 56, and simultaneously brings the body portion of said lug in alignment with the slot 61 of the channel-shaped lug 57.

The operator now rotates the handle 40 either counterclockwise until the lug 55 drops simultaneously into the slot 61 and the notch 59, or clockwise until said lug drops into the slot 61 and the notch 60. Assuming the latter, it is apparent, as shown in Fig. 14, that the member 46, rod 41, handle 40, and drive segment 56 are now rotatable as a unit to reciprocate the rack link 62.

As will be seen, travel of the rack link 62 toward the front of the jack transmits rotary motion to the wheels 26, but the return stroke does not.

The drive segment 56 may be oscillated through an arc of approximately ninety degrees, its movement in one direction being limited by the stop pin 64 and in the opposite direction by contact of the upper end of the handle with the ground. Upon disengagement of the lug 55 with either of the slots 59 or 60, the spring 68 automatically returns the drive segment 56 to its Fig. 13 position against the pin 64.

Referring now particularly to Fig. 8, it is apparent that movement of the rack bar 72 to the left causes the pinion 76 to rotate in a clockwise direction; whereas movement to the right causes said pinion to rotate in the opposite direction.

Assuming now that the operator, by pulling the handle 40 downwardly, causes the pinion to rotate clockwise, the ratchet teeth 79 formed on the disc 78, which is integral with said pinion, will engage the detent 86 to rotate the ratchet wheel 80 in the same direction. Since this ratchet wheel is keyed as at 81 to the shaft 32, the latter will be caused to rotate also in the same direction, that is, clockwise.

Simultaneously, the ratchet teeth 82, formed on one face of the ratchet 80, will engage the detent pin 94 of the adjacent wheel 26 to rotate the latter likewise in a clockwise direction.

At the same time, since the disc 112 is keyed to the shaft 32 as at 113, the ratchet teeth 114 thereon engage the detent pin 110 of the other wheel 26 to drive the latter also in a clockwise direction.

It should thus be apparent that an individual operator may both guide the loaded jack and simultaneously cause it to advance toward him with ease.

With particular reference to Figs. 8 and 10, it is noted that, as the rack bar 72 moves to the left, the horizontal extremity 101 of the arcuate extension 100 moves away from the lug 105, whereby the pawl 104 drops into engagement with the peripheral ratchet teeth 84 of the ratchet wheel 80, under the action of spring 108.

With this arrangement, in the event that the jack is traveling upgrade, the vehicle and the jack are prevented from rolling backward.

It should be apparent that, with this arrangement, the jack may be manually pulled at all times without oscillating the drive segment 56. It should also be manifest that, whenever the lug 55 is elevated out of the notch 61, the spring 68, in addition to performing the function previously described, also brings the extension 101 against the lug 105, thereby elevating the pawl 104 out of engagement with the ratchet teeth 84, so that the wheels 26 are free to rotate in either direction.

The advantages inherent in this construction are obvious. With the lug 55 in unengaged position, as in Fig. 4, the operator may pull or push the jack in the same manner as he would a conventional jack, for at such time the pawl 104 occupies the position shown in Fig. 10.

With the lug 55 in engaged position, as in Fig. 14, the operator may initially oscillate the segment 56 to set the loaded jack in motion, and thereafter pull it by the handle without disengaging the lug. This is true because the pawl 104, at this time in engagement with the ratchet teeth 84, is not effective against clockwise rotation of the wheels.

The guard plates 106 are provided primarily to protect the ratchet parts, although as previously stated one of them serves as a seat for the spring 108.

When the rack bar 72 moves to the right, the pinion 76 is rotated counterclockwise, but, due to the configuration of the ratchet teeth 79 and the bevel formed on the projecting portion 87 of the pin 86, no movement is imparted to the ratchet wheel 80. It should also be apparent, therefore, that the wheels 26 may rotate clockwise while the shaft 32 remains stationary.

It should further be evident, from the foregoing, that the ratchet and detent pin arrangements provide full differential action of the wheels. For example, as viewed in Fig. 5, if it were desired to pull the jack toward the operator, and to the left, the left-hand wheel 26 would rotate very slowly, if at all, whereas the right-hand wheel 26 would rotate rather rapidly.

While the preferred embodiment of the invention has been illustrated and described, it obviously admits of modifications without departing from the principle of the invention, the scope of which is limited only by the appended claims.

What is claimed is:

1. In a service jack of the type described containing a plurality of front wheels, manually operable rack and pinion means for rotating the front wheels of said jack in one direction, automatically operable pawl and ratchet means for preventing said wheels from rotating in the opposite direction, and means for rendering said pawl and ratchet means inoperative whereby the wheels are free to rotate in either direction, said means including an arcuate extension rigid with said rack for actuating the pawl.

2. In a service jack of the type described, manually operable rack and pinion means for rotating the front wheels of said jack in one direction, automatically operable pawl and ratchet means for preventing said wheels from rotating in the opposite direction, said last-named means including a spring interposed between a stationary portion of the jack frame and an upstanding lug on the hub of the pawl for effecting engagement of the latter with the teeth of said ratchet, means associated with said rack for effecting disengagement of the pawl from the teeth of said ratchet when the jack is manually propelled, said last-named means including an extension rigid with said rack and adapted to impinge against the upstanding lug on the hub of the pawl, and a spring secured at one end to a portion of the jack frame and at the other end to said rack biasing said pawl toward the disengaged position.

3. In combination with the operating mechanism included in a standard service jack of the character described, a pivotally mounted drive segment, a reciprocable link pivotally connected thereto, a rack bar rigid with said link, a support for the rack bar and a guide for the link, a rotatable pinion, and means for oscillating said segment to reciprocate said rack bar into and out of engagement with said pinion.

4. In combination with the operating mechanism included in a standard service jack of the character described, an actuating handle, a positioning rod-like member associated with the handle, a pivotally mounted drive segment, a reciprocable link pivotally connected thereto, a rack bar rigid with said link, a support for the rack bar and a guide for the link, a rotatable pinion, a lug rigid with the positioning rod-like member adapted to engage a selected notch in the peripheral portion of said segment for oscillating the latter to reciprocate said rack bar into and out of engagement with said pinion, and an abutment for limiting the oscillation of said segment in one direction.

5. In combination with the operating mechanism included in a standard service jack of the character described, a pivotally mounted drive segment provided with one or more peripheral notches, a horizontally disposed link having one end thereof pivotally connected to said segment, and its other end rigidly connected to a horizontally disposed rack bar, a supporting plate for the latter, a pinion rotatably mounted on a shaft in proximity to the rack bar, and manually operable means for oscillating the drive segment to reciprocate said rack bar into and out of engagement with the pinion.

6. In combination with the operating mechanism included in a standard service jack of the character described, an actuating handle, a positioning rod-like member associated with the handle, a pivotally mounted drive segment provided with one or more peripheral notches, a horizontally disposed link having one end thereof pivotally connected to said segment and its other end rigidly connected to a horizontally disposed rack bar, a supporting plate for the latter, a pinion rotatably mounted on a shaft in proximity to the rack bar, and manually operable means for oscillating the drive segment to reciprocate said rack bar into and out of engagement with the pinion, said last-named means comprising a laterally extending lug rigid with the positioning rod-like member adapted to engage one of the peripheral notches of said drive segment.

7. In combination with the operating handle, the handle positioning rod, the front and rear axles, the detent and ratchet mechanism on the front axle, the wheels rotatively mounted on the front axle, and the handle support rotatively mounted on the rear axle of a standard jack of the character described, a laterally projecting lug rigidly secured to said positioning rod near the lower extremity thereof, a channel-shaped lug rigidly secured to the handle support adjacent said rod, a drive segment pivotally mounted on the rear axle, one or more peripheral notches provided therein, a reciprocable rack bar assembly having a pivotal connection with said segment, and a pinion adapted to actuate the detent and ratchet mechanism on the rear axle for driving said wheels in one direction when said handle is oscillated with the laterally projecting lug on the rod positioned in the slot of said channel-shaped lug, and simultaneously in one of the peripheral notches of said segment.

8. In combination with the operating handle, the handle positioning rod, the front and rear axles, the wheels rotatively mounted on the front axle, and the handle support rotatively mounted on the rear axle of a standard jack of the character described, a laterally projecting lug rigidly secured to said positioning rod near the lower extremity thereof, a channel-shaped lug rigidly secured to the handle support adjacent said rod, a drive segment rotatably mounted on the rear axle, one or more peripheral notches provided therein, a horizontally disposed link pivotally connected to the segment at one end and provided with a rigidly attached rack bar at its other end, a guide bracket for the rack bar, a pinion rotatably mounted on said rear axle, cooperating detent and ratchet assemblies, provided respectively in said wheels and on said axle adapted to be actuated by the pinion when said handle is oscillated with the laterally projecting lug on the rod positioned in the slot of said channel-shaped lug, and simultaneously in one of the peripheral notches of said segment.

9. The driving mechanism of claim 8 in which said cooperating detent and ratchet assemblies comprise a horizontally disposed substantially hollow pin reciprocable in a bore provided in the hub portion of each wheel, a spring for yieldably causing one end of said pin to project beyond the face of said hub portion, a beveled surface provided on one side of said projecting end, and means for preventing rotation of said pin; a ratchet wheel rigidly secured to the axle adjacent one wheel and provided with ratchet teeth for engaging the projecting end of the detent pin in said adjacent wheel, a spring actuated pin reciprocable in a horizontal bore formed in said ratchet wheel, a beveled surface provided on one side of the projecting end of the pin and means for preventing rotation of said pin; a disc rigidly secured to the axle adjacent the other wheel and provided with ratchet teeth for engaging the projecting end of the detent pin in said adjacent wheel; and a disc rigid with the pinion and provided with ratchet teeth for engaging the projecting end of the detent in said ratchet wheel.

10. In a service jack of the type described, an axle; a plurality of wheels rotatably mounted on the axle; coordinating means between the wheels and the axle for causing them to rotate together in one direction; a handle member; disengageable interconnecting means between the handle member and at least one of the wheels whereby the latter are rotated together in one direction when the handle member is actuated, said interconnecting means including a reciprocating rack adapted to be connected to said handle by a clutch, one member of which is carried by said handle, and a pinion coacting with said rack rotatably mounted on the axle.

11. In a service jack of the type described, an axle; a plurality of wheels rotatably mounted on the axle; a handle member; and disengageable interconnecting means including a clutch adapted to be connected to the handle and comprising one clutch member carried by said handle between the handle member and the wheels whereby the latter are rotated together in one direction when the handle member is actuated, said means including a first member rotatably mounted on the axle and a second member fixedly mounted on the axle adjacent thereto, said members being limited to relative rotation in only one direction, and being adapted to differentially drive said wheels by means of a spring biased pin in one of said members adapted to engage ratchet teeth on said other member.

DOUGLAS JOHNSTON.

REFERENCES CITED

The following references are of record in the file of this patent:

UNITED STATES PATENTS

| Number | Name | Date |
|---|---|---|
| 659,189 | Weiner | Oct. 2, 1900 |
| 917,910 | Thomas | Apr. 13, 1909 |
| 926,131 | McGowan | June 29, 1909 |
| 1,163,485 | Sylvester | Dec. 7, 1915 |
| 1,591,535 | Kimball | July 6, 1926 |
| 1,614,764 | Rowell | Jan. 18, 1927 |
| 1,674,813 | Weaver et al. | June 26, 1928 |
| 2,037,700 | Bennett | Apr. 21, 1936 |
| 2,085,657 | Heisdorf | June 29, 1937 |

FOREIGN PATENTS

| Number | Country | Date |
|---|---|---|
| 16,727 | Great Britain | Sept. 21, 1916 |